United States Patent
Inoue et al.

(10) Patent No.: US 7,660,514 B2
(45) Date of Patent: Feb. 9, 2010

(54) VIDEO RECORDER AND METHOD FOR RESERVE-RECORDING A BROADCAST PROGRAM

(75) Inventors: Masayuki Inoue, Yokohama (JP); Yoshihiro Machida, Yokohama (JP); Kouji Kamogawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 810 days.

(21) Appl. No.: 11/296,689

(22) Filed: Dec. 8, 2005

(65) Prior Publication Data

US 2006/0140581 A1    Jun. 29, 2006

(30) Foreign Application Priority Data

Dec. 10, 2004    (JP)    ............................. 2004-357509

(51) Int. Cl.
*H04N 5/91*    (2006.01)
*H04N 7/00*    (2006.01)

(52) U.S. Cl. .......................................... 386/83; 386/46

(58) Field of Classification Search .................. 386/83, 386/46, 125, 1, 52, 124, 92
See application file for complete search history.

(56) References Cited

U.S. PATENT DOCUMENTS

2003/0219228 A1 *    11/2003    Thiagarajan et al. .......... 386/83

FOREIGN PATENT DOCUMENTS

JP    10-229526    8/1998

* cited by examiner

*Primary Examiner*—Robert Chevalier
(74) *Attorney, Agent, or Firm*—McDermott Will & Emery LLP

(57) ABSTRACT

A video recorder for recording a program video in a built-in HDD (hard disk drive) or the like on the basis of EPG data is easily put in a reserve-recording mode. To this end, reserve-recording candidate data is generated from the EPG data with use of recorded program information to facilitate selection of the reserve-recording mode. In a method for reserve-recording a broadcast program, similar program information is extracted from the EPG data on the basis of recorded title data held as the recorded program information, the extracted similar program data is converted to a data format usable for the reserve-recording, and is stored as reserve-recording candidate data upon reserve-recording.

17 Claims, 14 Drawing Sheets

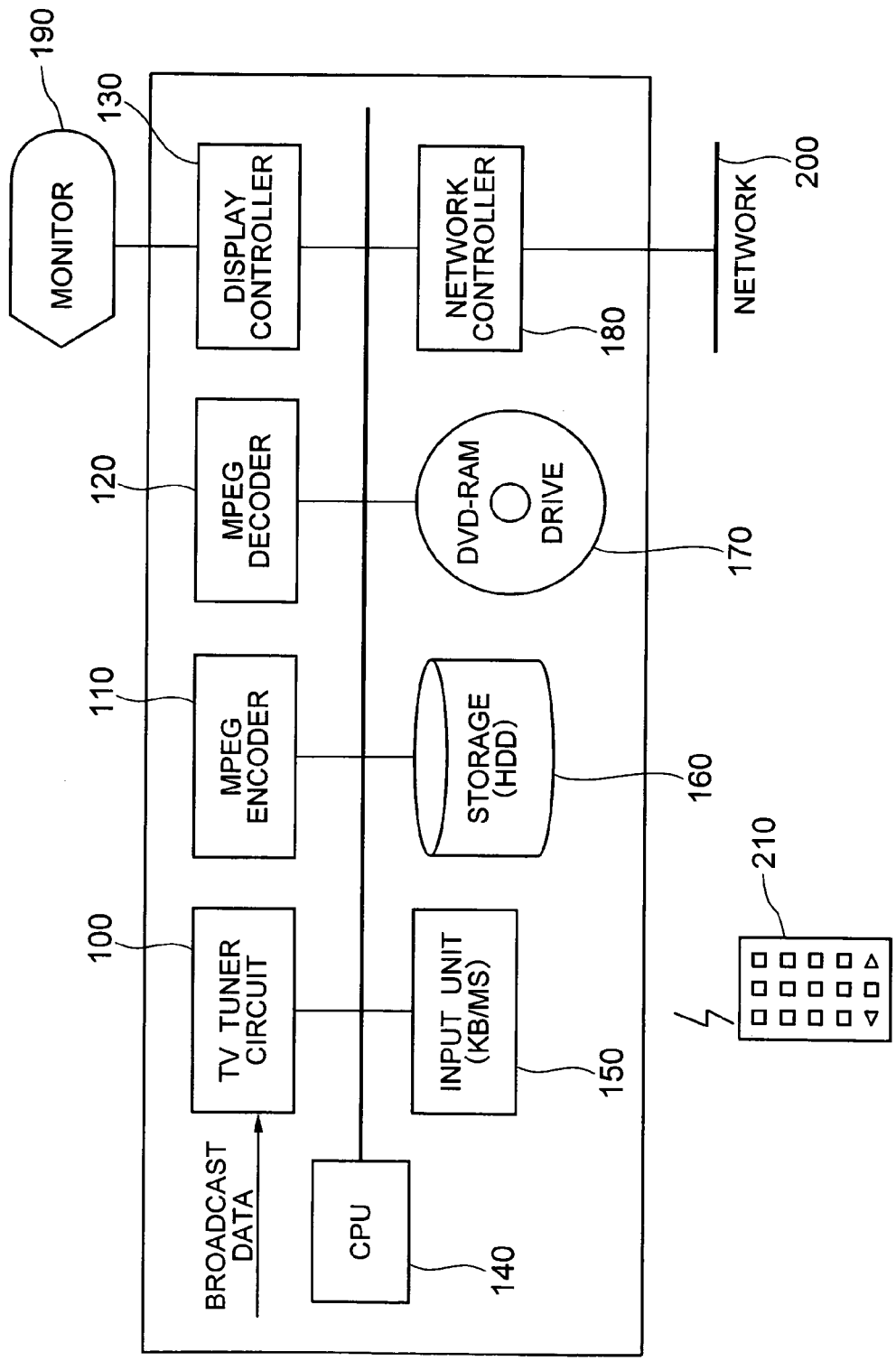

FIG. 3

| BROADCAST STATION ID (310) | DATE (311) | START TIME (312) | END TIME (313) | WEEKDAY (314) | TITLE NAME (315) |
|---|---|---|---|---|---|
| 1 | 2004/8/16 | ⋯ | ⋯ | MONDAY | ⋯ |
| 1 | 2004/8/16 | 19:00 | 20:00 | MONDAY | UNEXPLORED GREAT NATURE 20 |
| 1 | 2004/8/16 | 20:00 | 21:00 | MONDAY | BIG CAT WITH HER KITTIES |
| 1 | 2004/8/16 | 21:00 | 22:00 | MONDAY | NEWS 21 |
| 1 | 2004/8/16 | ⋯ | ⋯ | MONDAY | ⋯ |
| 3 | 2004/8/16 | ⋯ | ⋯ | MONDAY | ⋯ |
| 3 | 2004/8/16 | 8:00 | 9:00 | MONDAY | TOGETHER WITH MOM |
| 3 | 2004/8/16 | 9:00 | 10:00 | MONDAY | (RERUN) UNEXPLORED GREAT NATURE 19 |
| 3 | 2004/8/16 | 10:00 | 11:00 | MONDAY | GARDENING |
| 3 | 2004/8/16 | ⋯ | ⋯ | MONDAY | ⋯ |
| 1 | 2004/8/17 | ⋯ | ⋯ | TUESDAY | ⋯ |
| 1 | 2004/8/17 | 19:00 | 20:00 | TUESDAY | UNEXPLORED GREAT NATURE 21 |
| 1 | 2004/8/17 | 20:00 | 21:00 | TUESDAY | QUIZ, REALLY ? |
| 1 | 2004/8/17 | 21:00 | 22:00 | TUESDAY | NEWS 21 |
| 1 | 2004/8/17 | ⋯ | ⋯ | TUESDAY | ⋯ |
| 3 | 2004/8/17 | ⋯ | ⋯ | TUESDAY | ⋯ |
| 3 | 2004/8/17 | 8:00 | 9:00 | TUESDAY | TOGETHER WITH MOM |
| 3 | 2004/8/17 | 9:00 | 10:00 | TUESDAY | (RERUN) UNEXPLORED GREAT NATURE 20 |
| 3 | 2004/8/17 | 10:00 | 11:00 | TUESDAY | GARDENING |
| 3 | 2004/8/17 | ⋯ | ⋯ | TUESDAY | ⋯ |

FIG. 4

| BROADCAST STATION ID 400 | DATE 411 | START TIME 412 | END TIME 413 | WEEKDAY 414 | TITLE NAME 415 | QUALITY 416 |
|---|---|---|---|---|---|---|
| 1 | 2004/8/9 | 20:00 | 21:00 | MONDAY | BIG CAT WITH HER KITTIES | SP |
| 3 | 2004/8/13 | 8:00 | 9:00 | FRIDAY | TOGETHER WITH MOM | SP |
| 1 | 2004/8/13 | 19:00 | 20:00 | FRIDAY | UNEXPLORED GREAT NATURE 19 | XP |

FIG. 6

| BROADCAST STATION ID | DATE | START TIME | END TIME | WEEKDAY | TITLE NAME | QUALITY |
|---|---|---|---|---|---|---|
| 3 | 2004/8/16 | 9:00 | 10:00 | MONDAY | (RERUN) UNEXPLORED GREAT NATURE 19 | XP |
| 1 | 2004/8/16 | 19:00 | 20:00 | MONDAY | UNEXPLORED GREAT NATURE 20 | XP |
| 3 | 2004/8/17 | 9:00 | 10:00 | TUESDAY | (RERUN) UNEXPLORED GREAT NATURE 20 | XP |
| 1 | 2004/8/17 | 19:00 | 20:00 | TUESDAY | UNEXPLORED GREAT NATURE 21 | XP |
| 3 | 2004/8/18 | 9:00 | 10:00 | WEDNESDAY | (RERUN) UNEXPLORED GREAT NATURE 21 | XP |
| 1 | 2004/8/18 | 19:00 | 20:00 | WEDNESDAY | UNEXPLORED GREAT NATURE 22 | XP |
| 3 | 2004/8/19 | 9:00 | 10:00 | THURSDAY | (RERUN) UNEXPLORED GREAT NATURE 22 | XP |
| 1 | 2004/8/19 | 19:00 | 20:00 | THURSDAY | UNEXPLORED GREAT NATURE 23 | XP |
| 3 | 2004/8/20 | 9:00 | 10:00 | FRIDAY | (RERUN) UNEXPLORED GREAT NATURE 23 | XP |

FIG. 11

| BROADCAST STATION ID | DATE | START TIME | END TIME | WEEKDAY | TITLE NAME |
|---|---|---|---|---|---|
| 1 | 2004/8/9 | ..... | ..... | MONDAY | ................ |
| 1 | 2004/8/9 | 19:00 | 20:00 | MONDAY | UNEXPLORED GREAT NATURE 15 |
| 1 | 2004/8/9 | 20:00 | 21:00 | MONDAY | BIG CAT WITH HER KITTIES |
| 1 | 2004/8/9 | 21:00 | 22:00 | MONDAY | NEWS 21 |
| 1 | 2004/8/9 | ..... | ..... | MONDAY | ................ |
| 3 | 2004/8/9 | 8:00 | 9:00 | MONDAY | TOGETHER WITH MOM |
| 3 | 2004/8/9 | 9:00 | 10:00 | MONDAY | (RERUN) UNEXPLORED GREAT NATURE 14 |
| 3 | 2004/8/9 | 10:00 | 11:00 | MONDAY | GARDENING |
| 3 | 2004/8/9 | ..... | ..... | MONDAY | ................ |
| 1 | 2004/8/10 | ..... | ..... | TUESDAY | ................ |
| 1 | 2004/8/10 | 19:00 | 20:00 | TUESDAY | UNEXPLORED GREAT NATURE 16 |
| 1 | 2004/8/10 | 20:00 | 21:00 | TUESDAY | QUIZ, REALLY ? |
| 1 | 2004/8/10 | 21:00 | 22:00 | TUESDAY | NEWS 21 |
| 1 | 2004/8/10 | ..... | ..... | TUESDAY | ................ |
| 3 | 2004/8/10 | 8:00 | 9:00 | TUESDAY | TOGETHER WITH MOM |
| 3 | 2004/8/10 | 9:00 | 10:00 | TUESDAY | (RERUN) UNEXPLORED GREAT NATURE 15 |
| 3 | 2004/8/10 | 10:00 | 11:00 | TUESDAY | GARDENING |
| 3 | 2004/8/10 | ..... | ..... | TUESDAY | ................ |

FIG. 12

| BROADCAST STATION ID | DATE | START TIME | END TIME | WEEKDAY | TITLE NAME |
|---|---|---|---|---|---|
| 1 | 2004/8/23 | ..... | ..... | MONDAY | ............ |
| 1 | 2004/8/23 | 19:00 | 20:00 | MONDAY | ESTIMATED / UNEXPLORED GREAT NATURE |
| 1 | 2004/8/23 | 20:00 | 21:00 | MONDAY | ESTIMATED/BIG CAT WITH HER KITTIES |
| 1 | 2004/8/23 | 21:00 | 22:00 | MONDAY | ESTIMATED/NEWS 21 |
| 1 | 2004/8/23 | ..... | ..... | MONDAY | ............ |
| 3 | 2004/8/23 | ..... | ..... | MONDAY | ............ |
| 3 | 2004/8/23 | 8:00 | 9:00 | MONDAY | ESTIMATED/TOGETHER WITH MOM |
| 3 | 2004/8/23 | 9:00 | 10:00 | MONDAY | ESTIMATED/(RERUN) UNEXPLORED GREAT NATURE |
| 3 | 2004/8/23 | 10:00 | 11:00 | MONDAY | ESTIMATED/GARDENING |
| 3 | 2004/8/23 | ..... | ..... | MONDAY | ............ |
| 1 | 2004/8/24 | ..... | ..... | TUESDAY | ............ |
| 1 | 2004/8/24 | 19:00 | 20:00 | TUESDAY | ESTIMATED / UNEXPLORED GREAT NATURE |
| 1 | 2004/8/24 | 20:00 | 21:00 | TUESDAY | ESTIMATED/QUIZ, REALLY ? |
| 1 | 2004/8/24 | 21:00 | 22:00 | TUESDAY | ESTIMATED/NEWS 21 |
| 1 | 2004/8/24 | ..... | ..... | TUESDAY | ............ |
| 3 | 2004/8/24 | ..... | ..... | TUESDAY | ............ |
| 3 | 2004/8/24 | 8:00 | 9:00 | TUESDAY | ESTIMATED/TOGETHER WITH MOM |
| 3 | 2004/8/24 | 9:00 | 10:00 | TUESDAY | ESTIMATED/(RERUN) UNEXPLORED GREAT NATURE |
| 3 | 2004/8/24 | 10:00 | 11:00 | TUESDAY | ESTIMATED/GARDENING |
| 3 | 2004/8/24 | ..... | ..... | TUESDAY | ............ |

FIG. 13

| BROADCAST STATION ID | DATE | START TIME | END TIME | WEEKDAY | TITLE NAME | QUALITY |
|---|---|---|---|---|---|---|
| 1 | EVERY MONDAY | 20:00 | 21:00 | MONDAY | BIG CAT WITH HER KITTIES | SP |
| 1 | 2004/8/16 | 20:00 | 21:00 | MONDAY | BIG CAT WITH HER KITTIES | SP |
| 1 | 2004/8/23 | 20:00 | 21:00 | MONDAY | ESTIMATED/BIG CAT WITH HER KITTIES | SP |
| 1 | 2004/8/30 | 20:00 | 21:00 | MONDAY | ESTIMATED/BIG CAT WITH HER KITTIES | SP |
| 1 | 2004/9/5 | 20:00 | 21:00 | MONDAY | ESTIMATED/BIG CAT WITH HER KITTIES | SP |
| 1 | 2004/9/12 | 20:00 | 21:00 | MONDAY | ESTIMATED/BIG CAT WITH HER KITTIES | SP |

FIG. 14

| BROADCAST STATION ID | DATE | START TIME | END TIME | WEEKDAY | TITLE NAME | QUALITY |
|---|---|---|---|---|---|---|
| 3 | MONDAY-FRIDAY | 9:00 | 10:00 | MONDAY | (RERUN) UNEXPLORED GREAT NATURE | XP |
| 1 | MONDAY-FRIDAY | 19:00 | 20:00 | MONDAY | UNEXPLORED GREAT NATURE | XP |
| 3 | 2004/8/16 | 9:00 | 10:00 | MONDAY | (RERUN) UNEXPLORED GREAT NATURE 19 | XP |
| 1 | 2004/8/16 | 19:00 | 20:00 | MONDAY | UNEXPLORED GREAT NATURE 20 | XP |
| 3 | 2004/8/17 | 9:00 | 10:00 | TUESDAY | (RERUN) UNEXPLORED GREAT NATURE 20 | XP |
| 1 | 2004/8/17 | 19:00 | 20:00 | TUESDAY | UNEXPLORED GREAT NATURE 21 | XP |
| 3 | 2004/8/18 | 9:00 | 10:00 | WEDNESDAY | (RERUN) UNEXPLORED GREAT NATURE 21 | XP |
| 1 | 2004/8/18 | 19:00 | 20:00 | WEDNESDAY | UNEXPLORED GREAT NATURE 22 | XP |
| 3 | 2004/8/19 | 9:00 | 10:00 | THURSDAY | (RERUN) UNEXPLORED GREAT NATURE 22 | XP |
| 1 | 2004/8/19 | 19:00 | 20:00 | THURSDAY | UNEXPLORED GREAT NATURE 23 | XP |
| 3 | 2004/8/20 | 9:00 | 10:00 | FRIDAY | (RERUN) UNEXPLORED GREAT NATURE 23 | XP |
| 1 | 2004/8/20 | 19:00 | 20:00 | FRIDAY | UNEXPLORED GREAT NATURE 24 | XP |
| ... | ... | ... | ... | ... | ... | |
| 3 | 2004/8/23 | 9:00 | 10:00 | MONDAY | ESTIMATED/(RERUN) UNEXPLORED GREAT NATURE | XP |
| 1 | 2004/8/23 | 19:00 | 20:00 | MONDAY | ESTIMATED/UNEXPLORED GREAT NATURE | XP |
| 3 | 2004/8/24 | 9:00 | 10:00 | TUESDAY | ESTIMATED/(RERUN) UNEXPLORED GREAT NATURE | XP |
| 1 | 2004/8/24 | 19:00 | 20:00 | TUESDAY | ESTIMATED/UNEXPLORED GREAT NATURE | XP |

VIDEO RECORDER AND METHOD FOR RESERVE-RECORDING A BROADCAST PROGRAM

INCORPORATION BY REFERENCE

The present application claims priority from Japanese application JP2004-357509 filed on Dec. 10, 2004, the content of which is hereby incorporated by reference into this application.

BACKGROUND OF THE INVENTION

The present invention relates to a method for reserve-recording a program to be reserved such as a TV program, and more particularly to a technique which is effective when reserve-recording is carried out with use of a recorded title (program).

A digital video recorder such as a DVD (digital versatile disc)/HDD (hard disk drive) recorder shows signs of its spread in these years. Such a digital video recorder having a function of reserve-recording a broadcast program based on an EPG (Electronic Program Guide) can automatically record a TV program by previously selecting a program reservation mode.

Program data obtained from the EPG covers about one week (seven days) from the current time, and a desired TV program is reserve-recorded by browsing the EPG and selecting data about the desired program.

One of conventional digital broadcast receivers, can automatically reserve and output a next-time program on the basis of a user's past view history, for example, as disclosed in JP-A-10-229526.

SUMMARY OF THE INVENTION

However, in a method for reserve-recording a broadcast program from the EPG in the prior art digital video recorder, it is common practice that the user browses program data later than the current time from the acquired EPG data, searches for on the basis of data about the genres or performers of the programs, narrows the research down, and then selects a desired broadcast program to be reserve-recorded. Thus the prior art digital video recorder has no function of supporting facilitated setting of a reserve-recording mode with use of user-oriented information by a reserve-recording mode setter based on information about reserve-recorded or manually-recorded programs.

Further, the above JP-A-10-229526 is directed to a digital broadcast receiver which can automatically view a next-time program on the basis of the past view history and which has no function of supporting facilitated setting of a reserve-recording mode with use of user-oriented information as a setter of the reserve-recording mode, based on information about recorded programs.

An object of the present invention is therefore to provide a method for reserve-recording a broadcast program, by which reserve-recording candidate data is generated from EPG data with use of information about a recorded program and selection of a reserve-recording mode can be facilitated.

The reserve-recording method of the present invention is employed in a video recorder which acquires EPG data relating to broadcast programs and when it is desired to record the contents of a broadcast program, which holds program data about a recorded program is held therein. In the method, the user selects a recorded program and, when the user wants to look at reserve-recording candidates for setting of a reserve-recording mode, the user searches latest EPG data for a broadcast program identical to or similar to the selected recorded program on the basis of the held program data relating to the selected recorded program, and extracts it as reserve-recording candidate data upon setting of the reserve-recording mode.

In accordance with the present invention, since the user can extract the reserve-recording candidate on the basis of the recorded program information from the EPG data, the user can easily set the reserve-recording mode for the same program.

In accordance with the present invention, further, when the user wants to extract a reserve-recording candidate on the basis of the recorded program information, an appearance pattern for each program is detected from the past EPG data and the EPG data, and data on an available EPG data indication day and on days after the indication day is also generated as estimated EPG data. Thus, the number of viewable EPG days can be increased, a reserve-recording pattern such as every week, every day or week day can be accurately included in the reserve-recording candidate, and setting of the reserve-recording mode can be facilitated.

Other objects, features and advantages of the invention will become apparent from the following description of the embodiments of the invention taken in conjunction with the accompanying drawings.

BRIEF DESCRIPTION OF THE DRAWINGS

FIG. 2 shows an arrangement of a digital video recorder to which a function based on the reserve-recording method is applied;

FIG. 3 shows an example of EPG data 30 used in the video recorder;

FIG. 4 shows an example of recorded title data 40 used in the video recorder;

FIG. 6 shows an example of reserve-recording candidate data 50 used in the video recorder;

FIG. 11 shows an example of past EPG data used in the reserve-recording system;

FIG. 12 shows an example of estimated EPG data stored in the reserve-recording system;

FIG. 13 shows an example of the reserve-recording candidate data; and

FIG. 14 shows an example of the reserve-recording candidate data generated in the reserve-recording system.

DESCRIPTION OF THE EMBODIMENTS

Figure 1:
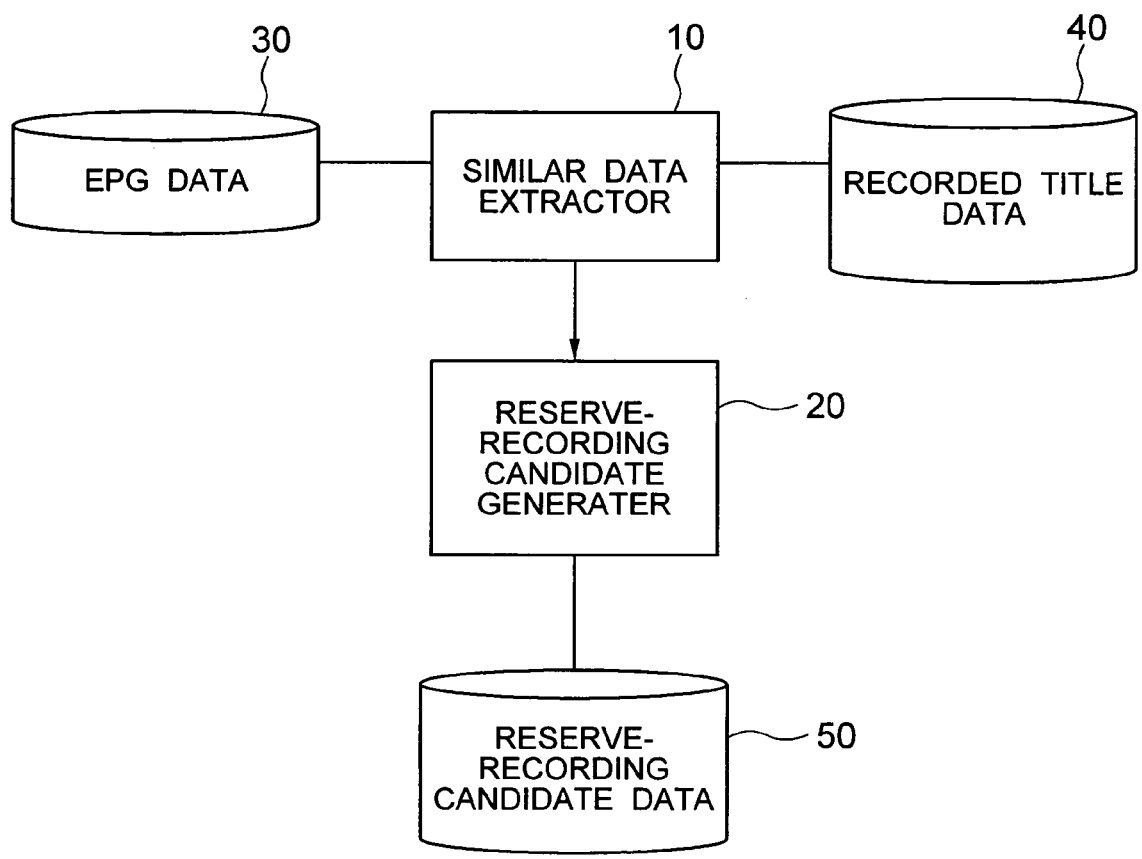
FIG. 1 shows a configuration of a reserve-recording system which embodies a reserve-recording method.

Embodiments of the present invention will be explained in detail with reference to the accompanying drawings. For explaining the embodiments, members having the same functions are denoted, in principle, by the same reference numerals to avoid double explanation thereof in all the drawings.

Embodiment 1

By referring to FIG. 1, explanation will be made as to a reserve-recording system which embodies a reserve-recording method in accordance with Embodiment 1 of the present invention. FIG. 1 shows a configuration of the reserve-recording system which embodies the reserve-recording method in accordance with Embodiment 1 of the present invention.

In FIG. 1, a reserve-recording system includes a similar data extractor 10 and a reserve-recording candidate generater 20.

The similar data extractor 10 extracts program data having information similar to program information of a recorded program selected by the user, from recorded title data (recorded program information) 40 stored in a recording device such as an HDD, e.g., by a video recorder, and from EPG data 30 stored in a recording device such as an HDD.

The reserve-recording candidate generater 20 formats the group of program data extracted by the similar data extractor 10 so that the program data group can be set to be reserve-recorded as reserve-recording candidates. For example, the program data group is stored in a recording device such as an HDD as reserve-recording candidate data 50.

Explanation will then be made as to the operation of how to put the reserve-recording system of Embodiment 1 of the invention in a reserve-recording mode.

In Embodiment 1, first, the EPG data 30 as program data acquired, e.g., from broadcast data or the like is stored in the recording device such as an HDD. Information relating to already-recorded programs is stored as recorded title data 40 in the recording device such as an HDD.

And the user can browse the data held as the recorded title data 40 via a display device or the like on the display screen in the form of a list of recorded titles. Each piece of recorded title information 40 in the recorded title data 40 includes information (such as broadcasting station ID, broadcast start time, end time, etc.) about broadcast programs available from the EPG data 30 in a record mode. These pieces of information are data browsable in the form of a list of recorded title information.

When the user requires reserve-recording candidates for selecting the program of a recorded title, for example, from the list of the recorded title data 40 on the screen and putting the system in a reserve-recording mode, the similar data extractor 10 sequentially extracts program data to be broadcast after the current time similar to the program data of the recorded title data 40 corresponding to the selected program from the EPG data 30 on the basis of the program data of the selected program, and holds it therein.

The reserve-recording candidate generater 20 then generates data (to add a record image quality, etc. thereto) usable as reserve-recording candidate data on the basis of the extracted and held program data, and stores it as the reserve-recording candidate data 50 in the recording device such as an HDD.

Since the reserve-recording candidate data 50 corresponds to program information similar to the program data having the recorded title selected by the user, the program of the recorded title selected by the user corresponds with a high possibility to a latest version of the same program to be broadcast in a few days or to its rebroadcast program and becomes program data effective as a reserve-recording candidate desired by the user to be put the system in the reserve-recording mode. Therefore, the user can easily put the system in the reserve-recording mode.

Embodiment 2

This embodiment corresponds to a digital video recorder to which the function of the reserve-recording method of Embodiment 1 is applied and which can select a reserve-recording mode with use of EPG data of a DVD/HDD recorder or the like.

FIG. 2 shows an arrangement of a digital video recorder to which the function of the reserve-recording method in Embodiment 2 of the present invention is applied.

In FIG. 2, the digital video recorder includes a TV tuner circuit 100, an MPEG encoder 110, an MPEG decoder 120, a display controller 130, a CPU 140, an input unit 150 such as a keyboard (KB) or mouse (MS), a storage 160 such as an HDD, a DVD-RAM drive 170, and a network controller 180. The display controller 130 is connected with a monitor 190, and the network controller 180 is connected to a network 200. A remote controller 210 for operating the digital video recorder is provided to the video recorder.

The digital video recorder of Embodiment 2, which has the TV tuner circuit 100 for receiving terrestrial or satellite broadcast wave, receives a broadcast program.

The received broadcast video program is compressed by the MPEG encoder 110, passed through the display controller 130, and then output to the monitor 190 to be watched by the user.

The encode video encoded by the MPEG encoder 110 is also stored in the storage 160 such as an HDD built therein as video information in the form of, e.g., a recorded video file or the like.

The encode video stored in the storage 160 or in a media such as a DVD-RAM is expanded by the MPEG decoder 120 to video information and then output to the monitor 190 via the display controller 130.

The broadcast program may be, in place of the above wave program, a program distributed via a cable TV or via the Internet.

The operation of the program to be viewed or the specification of a video to be reproduced may be carried out with use of the input unit 150 such as a keyboard or a mouse or with use of the remote controller 210; while the specification of a video to be reproduced is carried out on an exclusive menu display view or a file explorer.

CPU 140 can execute the respective means of Embodiment 1 to process the reserve-recording method. The CPU 140 controls the input control of broadcast data, the encode/decode control thereof, or the display controller 130 to display an input screen view about video information including recording start and recording end and to prompt the user to enter reservation information or the like specified using the input unit 150 or the remote controller 210.

When a program is recorded by reserve-recording execution or under control of an instruction from the remote controller 210, information on the program to be recorded is extracted from the EPG data 30 acquired from the broadcast data or the like, and the extracted information is stored in the storage 160 as the recorded title data 40.

The EPG data 30 is acquired based on the vertical blanking interval (VBI) or by the network controller 180 via the network 200 such as the Internet.

The DVD-RAM drive 170 can backup a video file or the like recorded in the storage 160 to an external storage or memory media or can output such a video file. The DVD- RAM drive is not limited to the DVD-RAM drive 170 but may employ a drive of another external storage media type.

Figure 5:
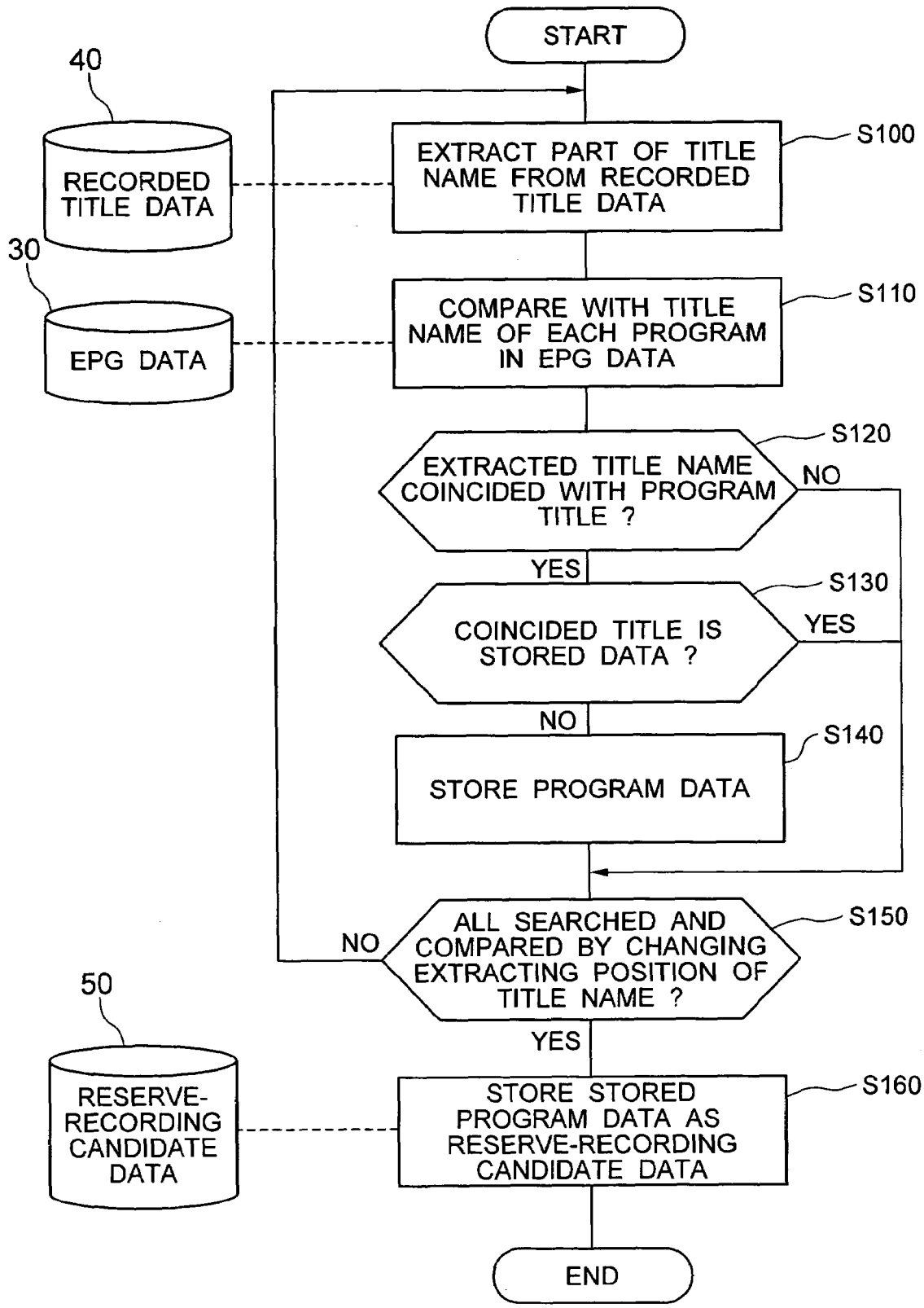
FIG. 5 is a flowchart showing an example of operation of generating reserve-recording candidate data for the video recorder.

Explanation will next be made as to an example of operation of how to put the digital video recorder of Embodiment 2 of the invention in the reserve-recording mode, by referring to FIGS. 3 to 6 showing a data processing example. FIG. 3 shows an example of the EPG data 30 used in the digital video recorder of Embodiment 2 of the invention. FIG. 4 shows an example of the recorded title data 40 used in the digital video recorder of Embodiment 2. FIG. 5 is a flowchart showing an example of operation of generating reserve-recording candidate data for the digital video recorder of Embodiment 2. FIG. 6 shows an example of the reserve-recording candidate data 50 used in the digital video recorder according to Embodiment 2 of the present invention. In this connection, the data examples shown in FIGS. 3, 4 and 6 are extractions from the respective data.

In FIG. 3, a broadcast station ID 310 corresponds to a channel number. A date 311 indicates year, month and day when the program is scheduled to be broadcast. A start time 312 indicates a time when the broadcast of the program is started, and an end time 313 indicates a time when the contents of the broadcast program is terminated. A weekday 314 indicates a day of the week on which the broadcast of the program is scheduled, and determined by the date 311. A title name 315 is a name applied to the program. And the title name is not always the same for the program even when the program is continually broadcast and has the same structure, and the tile name is determined by the creation originator of the acquired EPG data 30. Thus, even when the program has the same contents and "rebroadcast programs" having different broadcast times, the initial program and the rebroadcast program may have always the identical title name.

In FIG. 4, a broadcast station ID 410, a date 411, a start time 412, an end time 413, a weekday 414, and a title name 415 store therein the broadcast station ID 310, date 311, start time 312, end time 313, weekday 314, and title name 315 for the EPG data 30 as shown in FIG. 3, respectively. A picture quality 416 is a parameter which determines the fineness or clearness of a recorded video.

It is assumed that the first stage when reserve-recording candidate data is generated is such a state that CPU 140 first reads out such recorded title data 40 as shown in FIG. 4 from the storage 160 and converts it to a browsable data display arrangement, and the display data arrangement is displayed on the monitor 190.

And the user selects, for example, a program having a title name "Unexplored Great Nature 19" (""秘境大自然 19" in Kanji characters) from a list of displayed recorded titles by operating the input unit 150 or the remote controller 210. This is regarded as the user required a display of a list of reserve-recording candidates.

As shown in FIG. 5, in Step S100, CPU extracts, from the recorded title data 40, ones of characters (Kanji characters) of the title name of the program selected by the user and corresponding to 50% of the full title name indicated by a specified pointer (initially the first character (Kanji character)), and uses the extracted characters "Unexplored Great" (""秘境大自然" in Kanji characters) as a keyword. In the processing of Step S100, ones of characters of the program data of the selected recorded title corresponding to 50% indicated by the pointer (initially the first character) are extracted. This is because the title names of programs, even when having the same contents, include, for example, "rerun" indicative of a rebroadcast or a number such as "19" indicative of a broadcast frequency, and thus there occurs, when the full title name of the program is used, such a situation that there may be no data coinciding with data in the EPG data 30. The percentage of characters to be extracted is not limited to the above 50%, but may be varied depending on the title name, or characters optimum for similarity judgment may be set to be extracted.

In Step S110, on the basis of the extracted keyword, CPU compares it with title names in the EPG data 30 shown in FIG. 3.

In Step S120, CPU determines whether or not the comparison result means a coincidence therebetween. When finding a coincidence, CPU determines in Step S130 whether or not the coincided title is data already stored. When the title is not data already stored, CPU stores it as data coincided with the keyword in Step S140.

When CPU finds no coincidence as the comparison result in Step S120 or when CPU determines in Step S130 that the title is data already stored, CPU performs no data storing operation in Step S140.

In Step S150, CPU changes the keyword extracting position of the title name of the program selected by the user in the recorded title data 40. For example, when the keyword was "Unexplored Great" (""秘境大自然" in Kanji characters), CPU advance the extracting start position by one (Kanji) character and extracts "Great Nature" (""秘境大自然" in Kanji characters) as a keyword in Step S100. The operations of the subsequent Steps S110, S120, S130 and S140 are executed as necessary. The operation of Step S150 is continued until a character string of the latter half characters of the title name of the program data of the recorded title is used as a keyword. When CPU determines in Step S150 that comparison of all the character strings was completed, CPU stores the already-stored data in the storage 160 as the reserve-recording candidate data 50 in Step S160.

The operations of Steps S100 to S150 are executed by the similar data extractor 10 shown in FIG. 1.

The reserve-recording candidate data 50 stored in the storage 160 in Step S160 corresponds, for example, to such data as shown in FIG. 6 when program data in the EPG data 30 having "title name" similar to the recorded title selected by the user is stored as the reserve-recording candidate data 50.

The operation of Step S160 is carried out by the reserve-recording candidate generater 20 shown in FIG. 1.

CPU 40 displays the reserve-recording candidate data 50 stored in the storage 160 on the monitor 190 via the display controller 130. The user can set the reserve-recording mode by selecting a program in the reserve-recording candidate data using the input unit 150 or the remote controller 210.

Embodiment 3

In Embodiment 3, the EPG data 30 which lost its use effectiveness in Embodiment 1 as time elapses is stored as past EPG data 730 and is compared with the EPG data 30, and an appearance pattern of each program data is detected. In Embodiment 3, estimated EPG data 740 is uniquely generated and the past EPG data 730 is added to the EPG data 30. Thus, when reserve-recording candidate data 920 is generated similarly to in Embodiment 2, the number of pieces of reserve-recording candidate data can be increased, and a pattern record (based on everyday, every week, weekday, etc.) candidate can be included in the reserve-recording candidate data from the appearance pattern of each program data.

Figure 7:
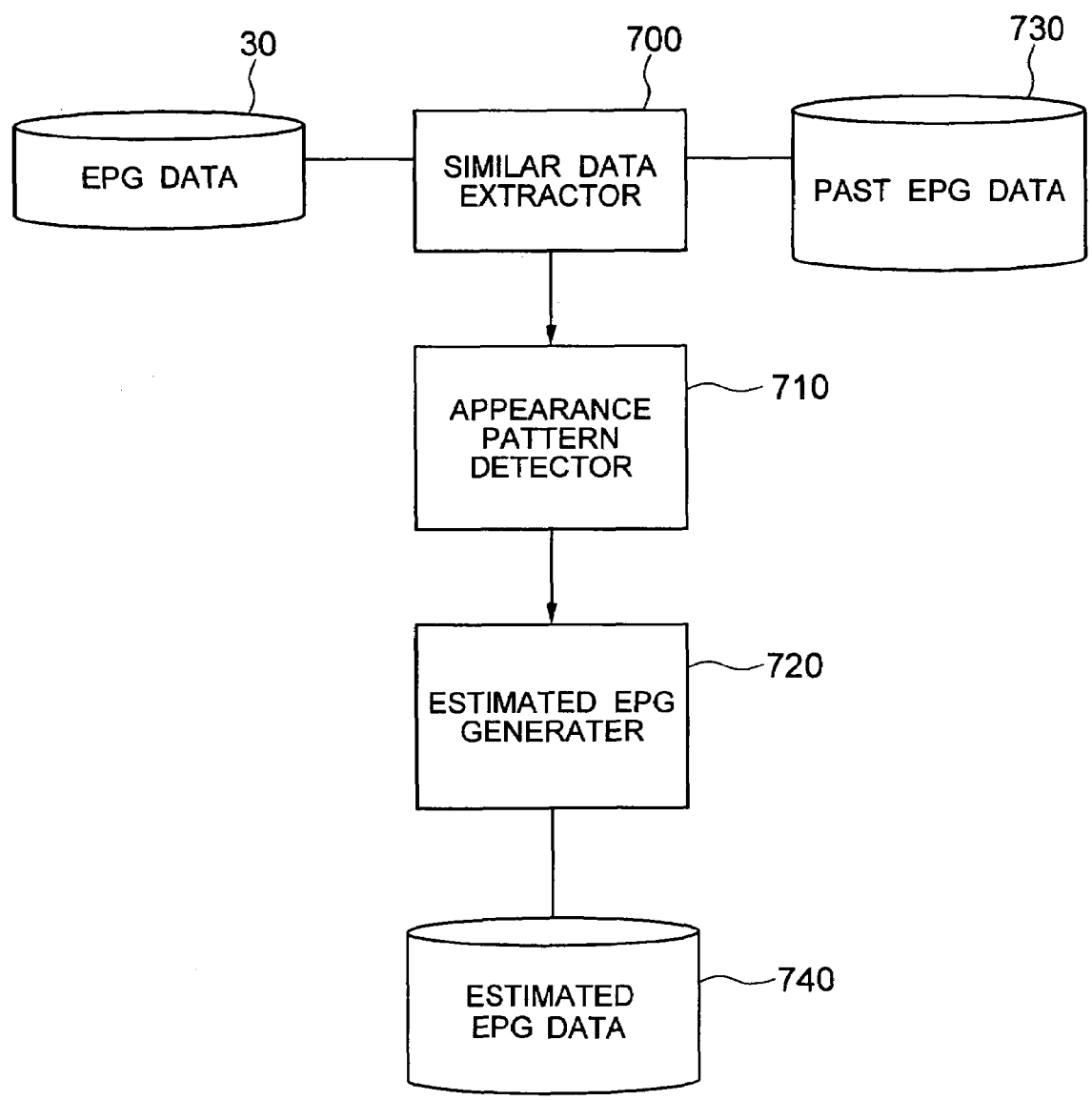
FIG. 7 shows an arrangement of a reserve-recording system which embodies the reserve-recording method.
Figure 8:
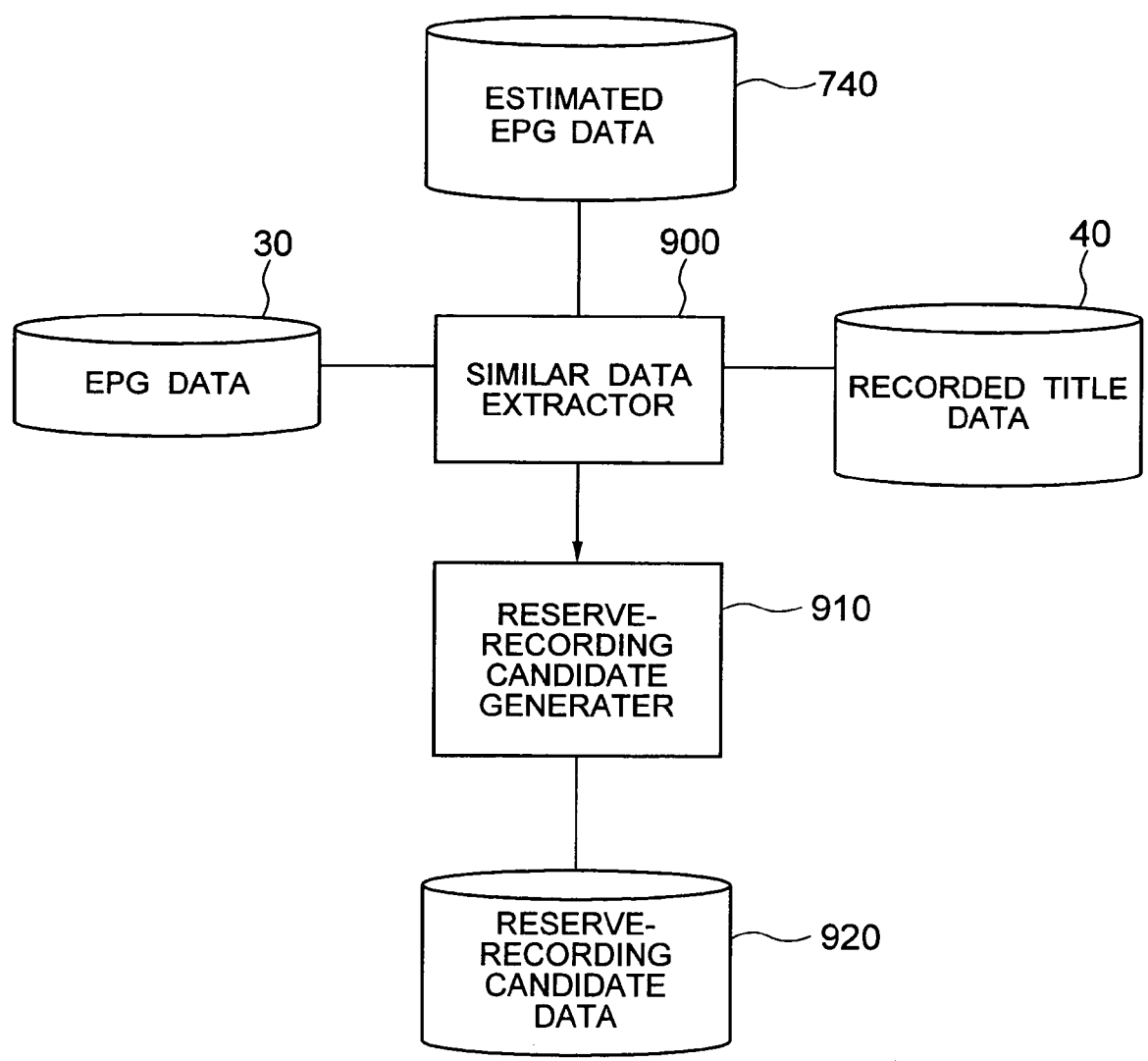
FIG. 8 shows another arrangement of the reserve-recording system which embodies the reserve-recording method.

FIG. 7 shows an arrangement of a section of the system which generates the estimated EPG data 740, and FIG. 8 shows an arrangement of a section of the system which generates reserve-recording candidate data 920 according to Embodiment 3 of the present invention.

In FIG. 7, the section of the system for generating the estimated EPG data includes a similar data extractor 700, an appearance pattern detector 710, and an estimated EPG generator 720.

The similar data extractor 700 reads out the EPG data 30 and the past EPG data 730 confirms whether or not each program data in the read-out EPG data 30 is present in the past EPG data 730 with the same broadcast station ID, the same start time, the same end time, and a similar title name. In the presence of such program data, the similar data extractor 700 holds it as similar program data.

The past EPG data 730 corresponds to the EPG data 30 acquired in the past and corresponds to the EPG data 30 which was stored as already used as time goes by.

The appearance pattern detector 710 detects an appearance pattern in which certain program data held as the similar program data by the similar data extractor 700 appears in both of the EPG data 30 and the past EPG data 730, to generate and store program data after the date possessed by the EPG data with use of the same appearance pattern depending on, for example, whether the program data appears on the same day of every week or appears only on weekdays.

The estimated EPG generator 720 formats the program data stored by the appearance pattern detector 710 into a data format enabling setting of the reserve-recording mode, and stores the formatted data as estimated EPG data 740 in a recording device such as an HDD.

In FIG. 8, the arrangement of the section of the system for generating the reserve-recording candidate data 920 corresponds to the arrangement of the reserve-recording system of Embodiment 1 of FIG. 1, but to which, in addition to the EPG data 30, the estimated EPG data 740 generated in FIG. 7 is added as additional data.

Thus, a similar data extractor 900, when compared with the similar data extractor 10 in Embodiment 1, reads out, in addition to the EPG data 30, the estimated EPG data 740 as additional data.

In a reserve-recording candidate generator 910, the quantity of data (duration) used by the reserve-recording candidates is increased due to the estimated EPG data 740. Thus, an appearance pattern of each program can be estimated and when compared with the reserve-recording candidate generator 20 in Embodiment 1, a reserve-recording candidate including a reserve-recording pattern (every day, every week, weekday, etc.) can be generated. The generated reserve-recording candidate is stored in the storage 160 as the reserve-recording candidate data 920.

Figure 9:
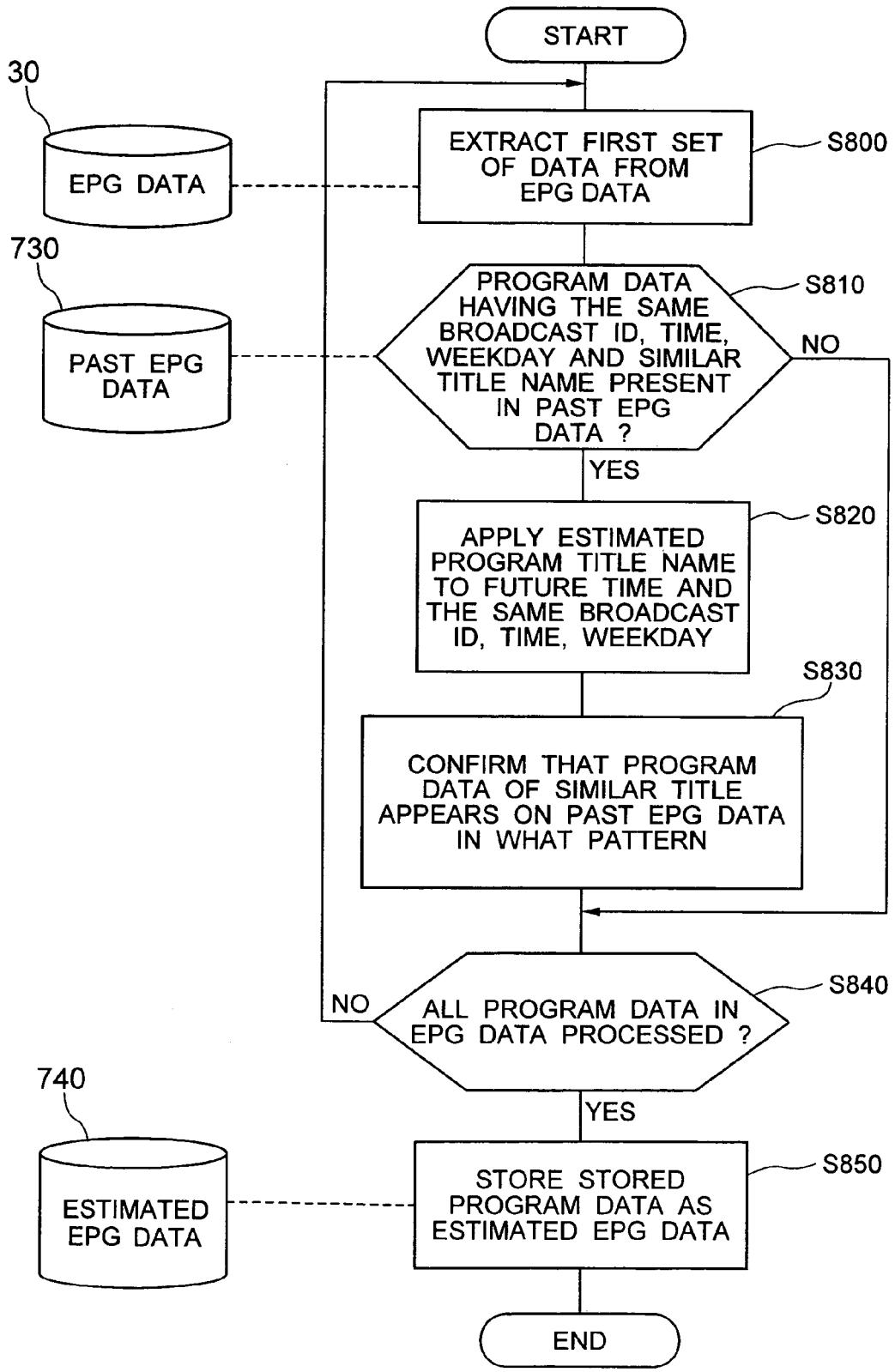
FIG. 9 is a flowchart showing the operation of the reserve-recording system.
Figure 10:
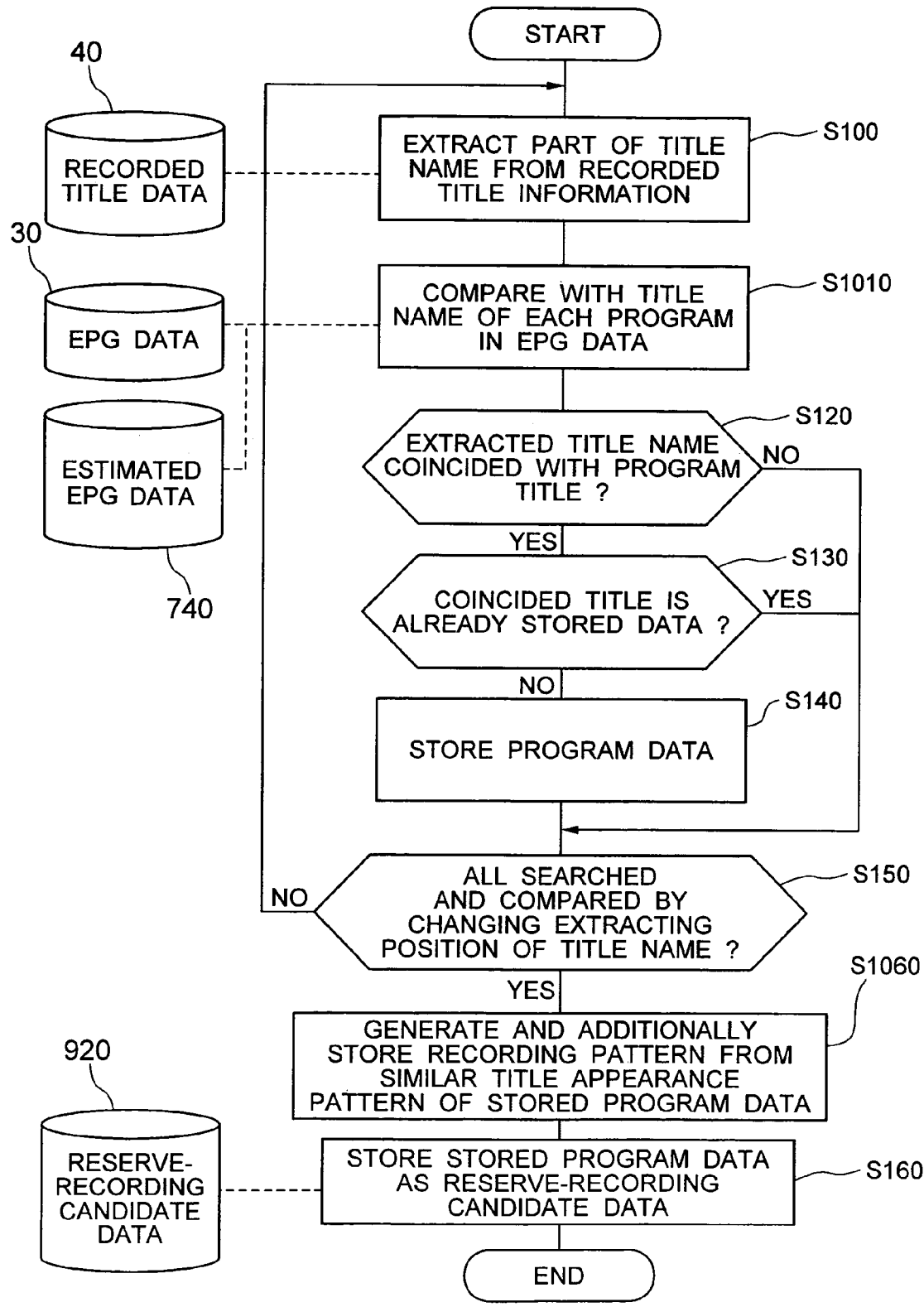
FIG. 10 is a flowchart for showing the operation of the reserve-recording system.

The operation of how to put the reserve-recording system according to Embodiment 3 of the present invention in a reserve-recording mode will be explained by referring to FIGS. 9 and 10. FIGS. 9 and 10 are flowcharts for explaining the operation of the reserve-recording system of Embodiment 3. More specifically, FIG. 9 shows the operation of a section for generating the estimated EPG data 740, and FIG. 10 shows the operation of a section for generating the reserve-recording candidate data 920.

In the operation of the section for generating the estimated EPG data 740, first, CPU extracts a first set of data from the EPG data 30 in Step S800, and determines whether or not there is program data having the same broadcast station ID, the same start time, the same end time and a similar title name as the data of one program extracted in Step S810 in Step S810, as shown in FIG. 9.

If the presence of similar program data is determined in Step S810, CPU confirms in Step S820 the program data having the similar title appears in what pattern on the past EPG data 730. In Step S830, CPU generates an estimated program title name as EPG data of a date later than the date of the program data of the EPG data 30 according to the appearance pattern (every day, every week, weekday, etc.), and stores it as program data.

In Step S840, CPU confirms whether or not to have performed the similar operations on all the program data in the EPG data 30. When CPU fails to perform the similar operations on all the program data, CPU again performs the similar operations of Step S800 and the subsequent steps on all the program data in the EPG data 30 and sequentially stores the processed program data.

The operations of Steps S800 to S840 are carried out by the similar data extractor 700 and the appearance pattern detector 710 shown in FIG. 7.

In Step S850, CPU finishes its operation on all the program data in the EPG data 30, formats the stored program data into a data format enabling setting of a reserve-recording mode, and then stores it in the storage 160 as the estimated EPG data 740.

The operation of Step S850 is carried out by the estimated EPG generator 720 shown in FIG. 7.

In the operation of the section for generating the reserve-recording candidate data 920, the estimated EPG data 740 and the recording pattern included in the reserve-recording candidate data are added to the operation of the flowchart of FIG. 5.

The EPG data 30 treated in Step S110 of the flowchart of FIG. 5 corresponds to the EPG data 30 and the estimated EPG data 740 in Step S1010 of the flowchart of FIG. 10. And the estimated EPG data 740 is included in the title name of each program to be compared.

In Step S1060 of the flowchart shown in FIG. 10, a recording pattern (every day, every week, weekday, etc.) can be generated, additionally stored and included in the reserve-recording candidate data 920 according to the appearance pattern of program data having a similar title name.

The operations of Steps S100 to S150 in the flowchart of FIG. 10 are carried out by the similar data extractor 900 shown in FIG. 8.

The operations of Steps S100 to S150 of the flowchart of FIG. 10 are carried out by the reserve-recording candidate generater 910 shown in FIG. 8.

By referring to FIGS. 11 to 14, explanation will next be made as to an example of data generated as reserve-recording candidates when data is processed by the reserve-recording system according to Embodiment 3 of the present invention. More specifically, FIG. 11 shows an example of past EPG data used in the reserve-recording system of Embodiment 3, FIG. 12 shows an example of estimated EPG data stored in the reserve-recording system of Embodiment 3, and FIGS. 13 and 14 show an example of reserve-recording candidate data generated by the reserve-recording system of Embodiment 3. In this connection, the data examples shown in FIGS. 11 to 14 are extractions of part of each data.

As shown in FIG. 11, the past EPG data 730 treated in Step S810 of the flowchart of FIG. 9 corresponds to the EPG data 30 which lost its use effectiveness as time goes by and was stored, and thus the past EPG data 730 is similar to the EPG data 30.

The estimated EPG data 740 stored in Step S840 of the flowchart of FIG. 9, as shown in FIG. 12, is data generated as the estimated EPG data 740 after comparison and check are made to know how the similar information about each program data in the EPG data 30 in FIG. 3 appears in the past EPG data 730 shown in FIG. 11. And the estimated EPG data 740 has a character "estimated/" ("予測/" in Kanji characters) inserted in front of its title name.

A result, after the user selects "Big Cat With Her Kitties" ("予連れ大猫" in Kanji characters) as the title name 415 in the recorded title information shown in FIG. 4 and it is subjected to the generating operation of reserve-recording candidate data shown in FIG. 10, is shown in FIG. 13. In FIG. 13, unlike the treatment of only the EPG data 30, the reserve-recording candidate data 920 contains the current EPG data 30 and the estimated EPG data 740 and also contains the reserve-recording candidates having the recording pattern (every Monday).

A result, after the user selects "Unexplored Great Nature 19" (""秘境大自然19" in Kanji characters) as the title name 415 in the recorded tile information shown in FIG. 4 and it is subjected to the generating operation of reserve-recording candidate data shown in FIG. 10, is shown in FIG. 14. The reserve-recording candidate data 920, unlike the treatment of only the EPG data 30, contains the current reserve-recording candidate generater 20 and the estimated EPG data 740 and also contains reserve-recording candidates having two recording patterns (weekdays, Monday to Friday) estimatedly generated.

On the basis of the reserve-recording candidate data 920 shown in FIGS. 13 and 14, the user can select not only a program to be next broadcast but an estimated program not present in the current EPG data 30 as a reserve-recording candidate, and also can select a reserve candidate such as every week or every day.

When the setting of the reserve-recording mode is carried out with use of the estimated EPG data 740 generated in Embodiment 3, since the estimated EPG data 740 is merely estimated data for reserve-recording, CPU 40 compares the estimated record data with the EPG data 30 before the reserve recording is actually carried out and when the formal EPG data 30 for the estimated data is acquired, confirms similarity matching between the title names or coincidence in the broadcast start time and end time therebetween, corrects the recording start time or end time or determines to stop the reserve recording as necessary, and displays the determined result on the monitor 190 in the form of information under control of the display controller 130.

Although the invention has been detailed in connection with the embodiments of the present invention, the present invention is not limited to the above specific embodiments but may be modified in various ways without departing from the subject matter or gist of the invention, as a matter of course.

In Embodiments 1 to 3, the user selects a program having a recorded title from a list of the recorded title data 40, and CPU generates reserve-recording candidate data for setting of the reserve-recording mode on the basis of information on the selected program. However, it is also possible that, for example, CPU displays a list of the past EPG data 730 on the monitor 190 under control of the display controller 130, and the user requires reserve-recording candidate data by selecting a program with use of the input unit 150 or the remote controller 210. In this case, CPU generates the reserve-recording candidate data 50 or the reserve-recording candidate data 920 on the basis of the past EPG data 730 in place of the recorded title data 40, and the user easily set the reserve-recording mode on the basis of the past program broadcast information.

The invention claimed is:

1. A video recorder for recording a broadcast video according to a predetermined schedule, comprising:

means for receiving said broadcast video and a broadcast schedule for said broadcast video;

a program guide recording unit for recording the broadcast schedule received by said receiving means;

a reserve-recording information recording unit for recording a recording schedule of said broadcast video;

a recording controller for generating the broadcast video received by said receiving means and generating video information about the recording video according to the recording schedule of said reserve-recording information recording unit;

a video recording unit for recording the recording video recorded by said recording controller and the video information of the recording video a; and a reserve-recording information generator for generating reserve-recording information to be recorded by said reserve-recording information recording unit on the basis of the broadcast schedule recorded by said program guide recording unit and the video information recorded by said video recording unit, said reserve-recording information generator comprising:

a similar data extractor which searches for a broadcast program which is similar to said video information recorded by said video recording unit among a broadcast schedule recorded by said program guide recording unit based on a video information recorded by said video recording unit; and a reserve-recording candidate generator which generates a recording schedule of the similar broadcast program searched by said similar data extractor, wherein said reserve-recording information recording unit records said reserve-recording information based on a reserve-recording candidate broadcast program extracted by said similar data extractor.

2. The video recorder according to claim 1, wherein:

said program guide recording unit records a program title, a broadcast station ID, a broadcast start time, and a broadcast end time; and said reserve-recording information records a broadcast station ID, a recording start time, a recording end time, and a recording quality.

3. The video recorder according to claim 2, wherein said reserve-recording information generator compares program title information of the video information recorded by said video recording unit with program title information of the broadcast schedule after a recording time of the video information to find a similarity to the program title.

4. The video recorder according to claim 3, wherein said reserve-recording information generator finds a program similarity by performing character string comparison of the title information.

5. The video recorder according to claim 1, wherein:

said program guide recording unit holds a past part of the broadcast schedule received by said receiving means, and said reserve-recording information generator finds a program similarity by comparing the received broadcast schedule with the past broadcast schedule held by said program guide recording unit and obtains reserve-recording information by estimating a broadcast schedule from a program having a higher similarity.

6. The video recorder according to claim 5, wherein said reserve- recording information generator applies an identification character to the program title of the estimated broadcast schedule.

7. The video recorder according to claim 6, wherein said reserve- recording information generator achieves matching between the estimated broadcast schedule and the broadcast schedule received by said receiving means.

8. A reserve-recording control method for a video recorder for recording a broadcast video according to a predetermined schedule comprising the steps of:
receiving a broadcast schedule and recording schedule information in a program guide recording unit;
acquiring video information about a recorded program from a video recording unit having a plurality of program videos recorded therein;
generating reserve-recording information on the basis of said video information about the recorded program and said schedule information, the step of generating reserve-recording information comprising steps of:
based on video information recorded in said video recording unit, extracting similar data by searching for a broadcast program which is similar to said video information recorded by said video recording unit among programs in a broadcast schedule recorded in said program guide recording unit, as a reserve-recording candidate program, and
extracting a schedule of the similar broadcast program searched by said similar data extractor, as the reserve-recording candidate program, from the broadcast schedule; and
recording the schedule of the reserve-recording candidate program, as reserve-recording information for the candidate program, in a reserve-recording information recording unit.

9. The reserve-recording control method according to claim 8, wherein the step of extracting similar data comprises comparing program title information of said recorded program with program title information of the broadcast schedule after a recording time of the recorded program to find a similarity to the program title and generate reserve-recording information.

10. The reserve-recording control method according to claim 9, wherein the step of extracting similar data comprises:
extracting part of character information from the title information of said recorded program; and
deciding whether or not said extracted character string is included in the program title information of the broadcast schedule.

11. The reserve-recording control method according to claim 10, wherein the extraction of said character information is carried out by changing an extracting position from the head of the program title and a length of the extracting character string.

12. The reserve-recording control method according to claim 8, further comprising the step of applying a recording condition to the generated reserve-recording information.

13. A reserve-recording control method for a video recorder for recording a broadcast video according to a predetermined schedule, comprising the steps of:
receiving a broadcast schedule and recording schedule information in a program guide recording unit;
holding a broadcast schedule received in the past;
comparing a program title of said received broadcast schedule with a program title of said past-received broadcast schedule to find a similarity;
generating an estimated program guide for a program as a future broadcast schedule, based on the similarity;
generating reserve-recording information on the basis of video information about a recorded program and schedule information, the step of generating reserve-recording information comprising steps of:
based on the video information about the recorded program, extracting similar data by searching for a broadcast program which is similar to said video information among programs in the future broadcast schedule for the estimated program guide, as a reserve-recording candidate program, and
extracting a schedule of the similar broadcast program searched by said similar data extractor, as the reserve-recording candidate program, from a broadcast schedule; and
recording the schedule of the reserve-recording candidate program, as reserve-recording information for the candidate program, in a reserve-recording information recording unit.

14. The reserve-recording control method according to claim 13, wherein said similarity is found by comparing a broadcast station ID, a program start time, a program end time, and a program title.

15. The reserve-recording control method according to claim 14, further comprising the step of adding an identification character indicative of an estimation to the program title of a program having a high similarity to generate the estimated program guide.

16. The reserve-recording control method according to claim 13, further comprising the steps of:
receiving a broadcast schedule and recording schedule information in a program guide recording unit; and
acquiring video information of the recorded program from a video recording unit having a plurality of program videos recorded therein;
wherein the extracting step comprises steps of:
comparing said received broadcast schedule, the past-received broadcast schedule, and a program title of the video information of the recorded program to find a similarity; and
generating reserve-recording information for a high-similarity program identified by the comparing step, as a candidate program to be recorded.

17. The reserve-recording control method according to claim 16, further comprising the step of modifying reserve-recording information previously generated on the basis of a broadcast schedule newly received.

* * * * *

UNITED STATES PATENT AND TRADEMARK OFFICE
CERTIFICATE OF CORRECTION

| | | |
|---|---|---|
| PATENT NO. | : 7,660,514 B2 | Page 1 of 1 |
| APPLICATION NO. | : 11/296689 | |
| DATED | : February 9, 2010 | |
| INVENTOR(S) | : Inoue et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Twenty-eighth Day of December, 2010

David J. Kappos
*Director of the United States Patent and Trademark Office*